(12) United States Patent
Cha

(10) Patent No.: US 7,145,728 B2
(45) Date of Patent: Dec. 5, 2006

(54) PROJECTION APPARATUS

(75) Inventor: Yong-dok Cha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/139,247

(22) Filed: May 7, 2002

(65) Prior Publication Data

US 2003/0043468 A1 Mar. 6, 2003

(30) Foreign Application Priority Data

Aug. 31, 2001 (KR) ................ 2001-53269

(51) Int. Cl.
*G02B 27/14* (2006.01)
(52) U.S. Cl. .................. 359/637; 359/823; 353/70
(58) Field of Classification Search ........... 359/618, 359/537, 542, 546, 554, 838, 850, 242, 251, 359/637, 823; 353/99, 101, 70; 349/106; 358/60; 352/105; 362/268, 455
See application file for complete search history.

(56) References Cited

U.S. PATENT DOCUMENTS

| | | | |
|---|---|---|---|
| 5,185,660 A | | 2/1993 | Um |
| 5,502,514 A | * | 3/1996 | Vogeley et al. ............. 348/771 |
| 5,564,811 A | | 10/1996 | Lim |
| 5,592,188 A | * | 1/1997 | Doherty et al. ............... 345/84 |
| 5,839,808 A | * | 11/1998 | Koyama et al. .............. 353/97 |
| 6,005,722 A | * | 12/1999 | Butterworth et al. ........ 359/712 |
| 6,076,931 A | * | 6/2000 | Bone et al. ................. 353/100 |
| 6,118,501 A | * | 9/2000 | Ohzawa ......................... 349/5 |
| 6,129,437 A | | 10/2000 | Koga et al. |
| 6,219,110 B1 | * | 4/2001 | Ishikawa et al. ............ 348/759 |
| 6,431,727 B1 | * | 8/2002 | Sugawara et al. .......... 362/244 |
| 6,457,834 B1 | * | 10/2002 | Cotton et al. ............... 353/122 |

| 2002/0008812 A1 | * | 1/2002 | Conner et al. ............. 349/106 |

FOREIGN PATENT DOCUMENTS

| CN | 1251661 | 4/2000 |
|---|---|---|
| CN | 1398361 | 2/2003 |
| JP | 5-100311 | 4/1993 |

(Continued)

OTHER PUBLICATIONS

Japanese Office Action issued Apr. 19, 2005.

(Continued)

*Primary Examiner*—Hung Xuan Dang
*Assistant Examiner*—Joseph Martinez
(74) *Attorney, Agent, or Firm*—Staas & Halsey LLP

(57) ABSTRACT

A projection apparatus including a light source which generates light beams, an optical projection system which projects the light beams generated by the light source onto a screen, and a reflection device which is positioned between the light source and the optical projection system. The reflection device includes a plurality of mirrors capable of reflecting incident beams generated by the light source to travel toward the optical projection system. The projection apparatus also includes an optical illumination system which is positioned in an optical path between the light source and the reflection device and is tilted or decentered with respect to the optical axis of the light source to allow light beams generated by the light source to enter the reflection device at a predetermined angle. Since the optical paths of the optical projection system and the optical illumination system can be separated from each other by installing lenses in the optical illumination system, it is possible to manufacture the projection apparatus through a simple assembly and improve optical efficiency and a contrast ratio.

42 Claims, 4 Drawing Sheets

FOREIGN PATENT DOCUMENTS

| | | |
|---|---|---|
| JP | 06-332045 | 12/1994 |
| JP | 07-272301 | 10/1995 |
| JP | 07-287190 | 10/1995 |
| JP | 08-160378 | 6/1996 |
| JP | 10-228063 | 8/1998 |
| JP | 11-281914 | 10/1999 |
| JP | 11-327043 | 11/1999 |
| JP | 2000-009992 | 1/2000 |
| JP | 2000-39585 | 2/2000 |
| JP | 2000-231066 | 8/2000 |
| JP | 2000-321527 | 11/2000 |
| JP | 2001-021962 | 1/2001 |
| JP | 2001-051232 | 2/2001 |
| JP | 2001-51232 | 2/2001 |
| JP | 2001-92003 | 4/2001 |
| JP | 2001-092003 | 4/2001 |
| JP | 2001-109088 | 4/2001 |
| JP | 2003-075769 | 3/2003 |
| JP | 2004-029325 | 1/2004 |
| WO | WO 93/2395 | 11/1993 |
| WO | 99/26103 | 5/1999 |
| WO | 01/23941 | 4/2001 |
| WO | WO 01/23941 | 4/2001 |
| WO | WO 01/23941 A1 | 4/2001 |

OTHER PUBLICATIONS

Japanese Patent Office, Office Action in Japanese Application No. 2002-252099, Aug. 23, 2005.

Japanese Office Action dated Dec. 17, 2005 for Japanese Application No. 2002-252099.

Japanese Office Action dated Apr. 11, 2006 issued with respect to Japanese Application No. 2002-252099.

* cited by examiner

PROJECTION APPARATUS

CROSS-REFERENCE TO RELATED APPLICATIONS

This application claims the benefit of Korean Application No. 2001-53269, filed Aug. 31, 2001, in the Korean Industrial Property Office, the disclosure of which is incorporated herein by reference.

BACKGROUND OF THE INVENTION

1. Field of the Invention

The present invention relates to a projection apparatus, and more particularly, to a projection apparatus using a digital micromirror device (DMD).

2. Description of the Related Art

A projection apparatus includes a light source, an optical illumination system, a projection device, and an optical projection system and projects enlarged picture images on a screen. Projection apparatuses using a cathode ray tube (CRT) or a liquid crystal display (LCD) are well known in the art to which the present invention pertains.

Specifically, a CRT projection apparatus employs a CRT to create images on an illumination surface by electron beams colliding with the illumination surface. However, the CRT projection apparatus requires a process to convert digital signals into analog signals in order to realize digitized images, and it is difficult to manufacture a small CRT projection apparatus because of the inherently large-size of the CRTs.

An LCD projection apparatus employs liquid crystal, which has characteristics between those of a liquid and those of a solid, and has a molecular arrangement varying in accordance with the direction of an electric field generated by a voltage application. Since the LCD projection apparatus operates according to a polarization principle, polarized components not being used are blocked. In addition, in the LCD projection apparatus, the distance between pixels is very large, and thus the optical efficiency of the LCD projection apparatus is very low.

In order to solve the problems with the conventional projection apparatuses, a projection apparatus has been developed which is manufactured by using micro electro-mechanical system (MEMS) technology and includes a digital micromirror device (DMD) including a plurality of micromirrors.

The DMD includes pixels having two-dimensionally arranged micromirrors and controls a turning on/off of each of the micromirrors by allowing the micromirrors to operate with a first or second inclination angle, taking advantage of the electrostatic field action of memory devices corresponding to the pixels, and thus varying the angle of reflected beams. In addition, since the DMD is formed of the same material as a semiconductor integrated circuit (silicon), following a conventional design rule of 0.8 μm, the productivity and reliability of the DMD is very high.

In such a projection apparatus using a DMD, micromirrors having a size of about 16 microns are employed, and the distance between the micromirrors is about 1 micron. Thus, it is possible to manufacture a projection apparatus to have a size of no greater than 1 inch and obtain an optical efficiency of no less than 90% in the projection apparatus. In addition, the projection apparatus using the DMD exhibits a response speed faster than that of a conventional projection apparatus and thus is capable of reproducing moving images more smoothly.

FIG. 1 is a cross-sectional view illustrating a projection apparatus using prisms, which is one type of conventional projection apparatus using a DMD. Referring to FIG. 1, the projection apparatus using prisms includes an optical illumination system including a light source 11, which includes a lamp and a reflection mirror (not shown), a focusing lens 13, which focuses beams generated by the light source 11, and a reflection mirror 15, which reflects the beams incident from the focusing lens 13 to enter a prism.

First prism 14 includes two smaller prisms and allows the incident beams reflected by the reflection mirror 15 to exit. Second prism 16 includes three smaller prisms and divides the incident beams passing through the first prism 14 into green, blue, and red beams. The first and second prisms 14, 16 are positioned between first through third DMDs 17 and an optical projection apparatus 19.

The green, blue, and red beams divided by the second prism 16 travel toward the first through third DMDs 17, respectively, and then are reflected. The green, blue, and red beams reflected by the first through third DMDs 17, respectively, are converted into digitized beams and enter the second prism 16 a second time. The digitized green, blue, and red beams entering the second prism 16 sequentially pass through the first prism 14 and the optical projection apparatus 19 and then are projected onto a screen (not shown).

In the conventional projection apparatus described above, the two prisms forming the first prism 14 and the three prisms forming the second prism 16 must be manufactured to have different forms and different angles. Thus, it is difficult to manufacture and assemble the first and second prisms 14 and 16.

In addition, beams are easily reflected by the surfaces of the prisms and by a protective glass surface of each of the DMDs 17 to then directly enter the optical projection apparatus 19, and this may have a bad influence on the contrast ratio (the lumens of a picture image). Here, the contrast ratio represents a difference between the brightest portion of a picture image and the darkest portion of the picture image. Even when the picture image displayed on the screen of the projection apparatus or a television is completely dark, white spots may be generated on the screen by beams that are reflected by the surface of one of the prisms or by the protective glass surface of each of the DMDs 17. Thus, the quality of the picture image displayed on the screen may deteriorate.

SUMMARY OF THE INVENTION

Accordingly, it is an object of the present invention to provide a projection apparatus, which is capable of improving contrast ratio and optical efficiency and is easy to manufacture and assemble.

Additional objects and advantages of the invention will be set forth in part in the description which follows and, in part, will be obvious from the description, or may be learned by practice of the invention.

The foregoing and other objects and advantages of the present invention are achieved by providing a projection apparatus, including a screen; a light source to generate light beams; an optical projection system to project the light beams generated by the light source onto the screen; a reflection device to reflect light beams generated by the light source and incident thereon to travel toward the optical projection system; and an optical illumination system, positioned in an optical path between the light source and the reflection device and tilted or decentered with respect to an optical axis of the light source to allow the light beams generated by the light source to enter the reflection device at a predetermined angle.

The present invention relates to a projection apparatus using a digital micromirror device (DMD). The optical paths of the optical projection system and the optical illumination system can be separated from each other by installing lenses in the optical illumination system. The projection apparatus according to the present invention has a simple structure in which a lens is used, can be easily manufactured, can remove optical loss occurring in prisms, and thereby improves optical efficiency and prevents the deterioration of contrast occurring in the projection apparatus using prisms.

Here, "decentered" represents that the center axis of the lens is not aligned with the optical axis of the light source, is arranged to be parallel with the optical axis of the light source, and the center of the lens is not aligned with respect to the optical axis of the light source. In addition, "tilted" represents that the center axis of the lens is inclined to the optical axis of the light source.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
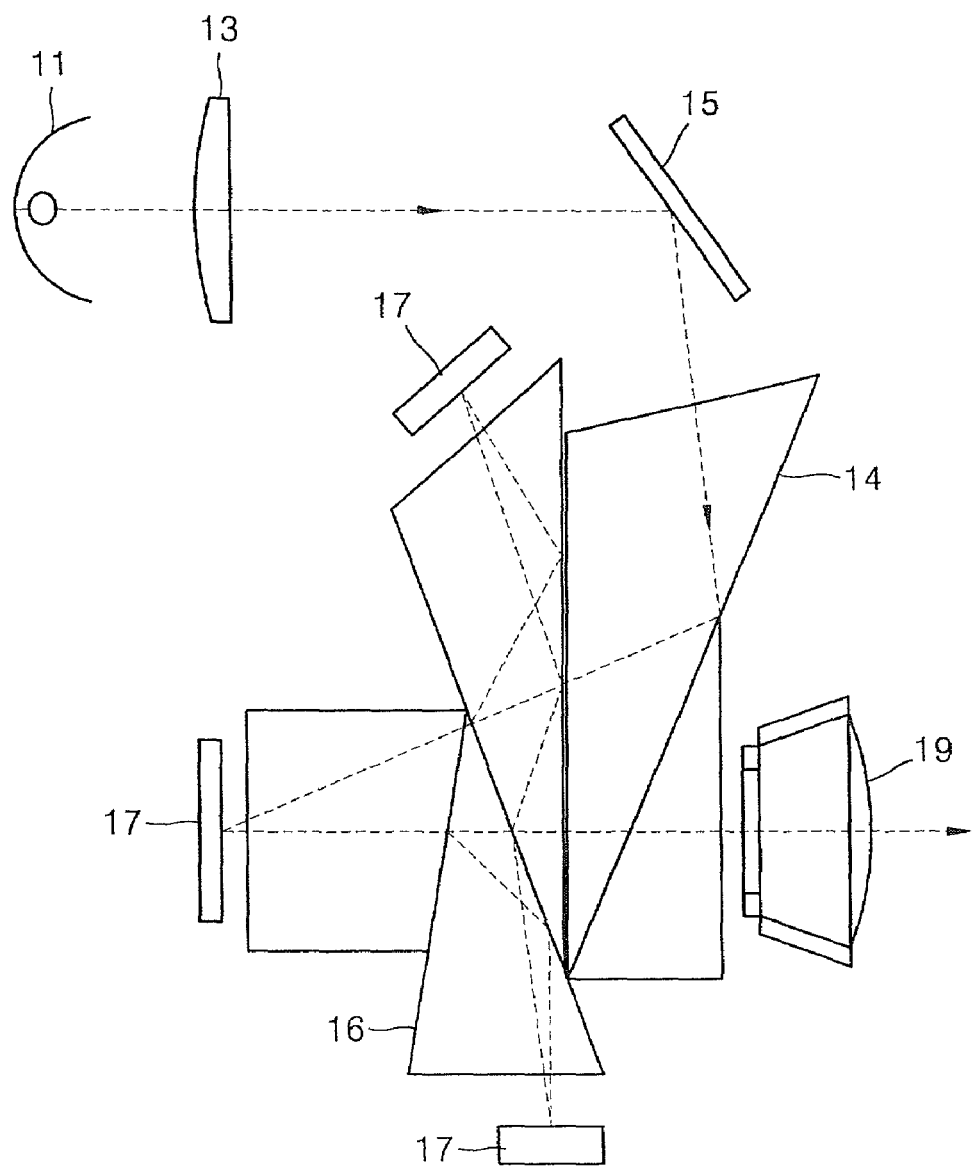
FIG. 1 is a cross-sectional view illustrating a conventional projection apparatus using prisms.

Reference will now be made in detail to the present preferred embodiments of the present invention, examples of which are illustrated in the accompanying drawings, wherein like reference numerals refer to like elements throughout.

Figure 2:
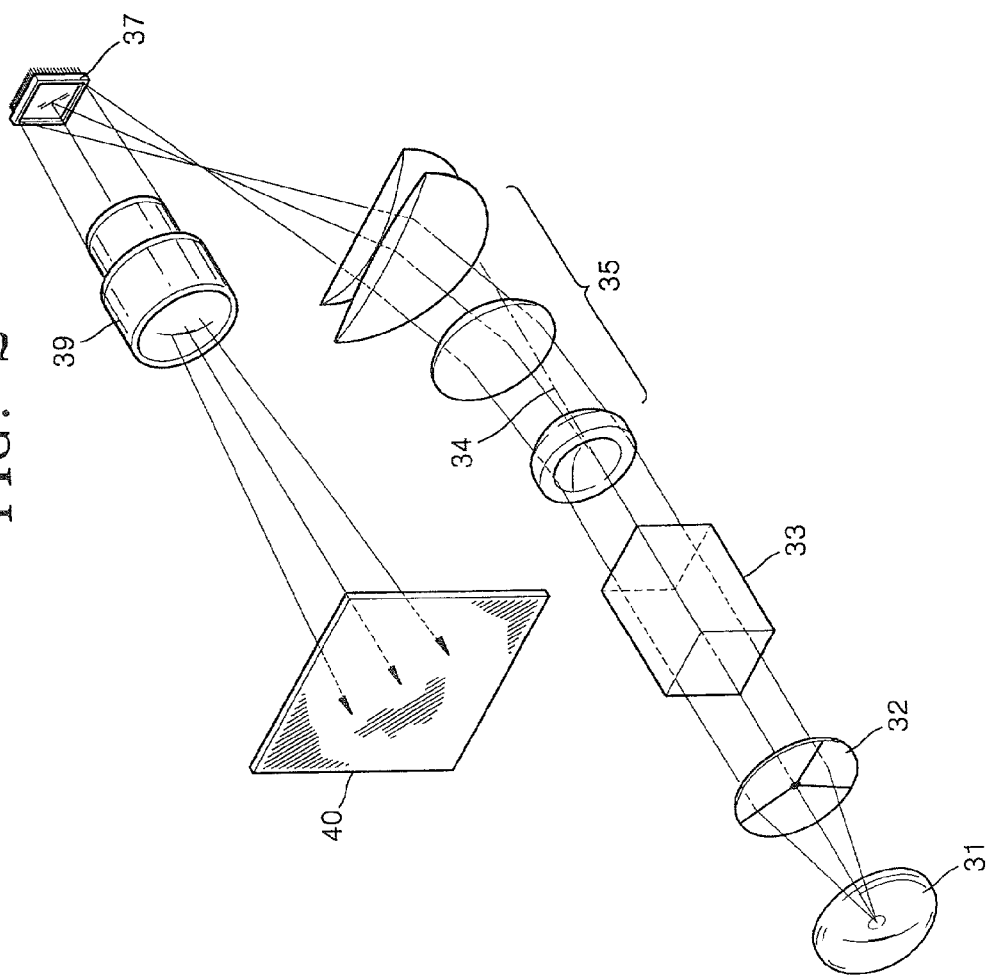
FIG. 2 is a perspective view illustrating a projection apparatus according to an embodiment of the present invention.

FIG. 2 is a perspective view illustrating a projection apparatus according to an embodiment of the present invention. Referring to FIG. 2, the projection apparatus includes a light source 31, which generates light beams, an optical projection system 39, which projects picture images on a screen 40, and a reflection device 37, which is positioned between the light source 31 and the optical projection system 39. The reflection device 37 includes a plurality of mirrors capable of allowing incident light beams generated by the light source 31 to travel toward the optical projection system 39. The projection apparatus further includes an optical illumination system 35 which is positioned in an optical path between the light source 31 and the reflection device 37 and is decentered or tilted with respect to an optical axis 34 (of the light source 31) to permit the incident light beams generated by the light source 31 to enter the reflection device 37 at a predetermined angle. Here, the reflection device 37 corresponds to a digital micromirror device (DMD).

A light pipe 33 to convert the shape of a light beam into the same shape as the reflection device 37 is further positioned between the light source 31 and the optical illumination system 35. Instead of the light pipe 33, a fly eye lens, which includes a plurality of lenses, may be used as a beam shaper. A color filter 32 to divide light beams into red, green, and blue beams is further installed between the light source 31 and the light pipe 33. A white light source, such as an arc lamp, may be used as the light source 31.

The color filter 32 has a transmission filter, which is divided into three equal parts corresponding to red, green, and blue colors, respectively. When rotating the color filter 32 about the optical axis 34 of the light source 31, white light beams are divided in order into red, green, and blue light beams.

The light pipe 33 or the fly eye lens shape a light beam into the shape of the surface of the reflection device 37, that is, a rectangular shape. In addition, the light pipe 33 makes the size of the light beam illuminated on the reflection device 37 slightly larger than the size of the reflection device 37 in order to increase optical efficiency. Accordingly, the optical efficiency of a light beam reflected by the reflection device 37 and entering the screen 40 can be maximized, and thus the contrast of a picture image displayed on the screen 40 can be prevented from deteriorating. The beam shaper, such as the light pipe 33 or the fly eye lens, may be provided as an element of the optical illumination system 35.

The optical illumination system 35 may include one lens or a plurality of lenses, each having a center axis (see FIG. 3–6). The optical illumination system 35 of the present invention is decentered or tilted with respect to the optical axis 34 of the light source 31, thus light beams passing through the optical illumination system 35 can be refracted by a predetermined angle. In other words, the optical illumination system 35 can allow light beams to enter the reflection device 37 at a predetermined angle by modifying the path of the light beams.

As shown in FIG. 2, the optical illumination system 35 may include four lenses. The lenses are arranged between the light pipe 33 and the reflection device 37 such that the path of the light beams sequentially passing through the four lenses can gradually vary as many times as the number of lenses (four in this case).

When a plurality of mirrors included in the reflection device 37 are tilted by a first angle, light beams reflected by the reflection device 37 can travel toward the optical projection system 39. On the other hand, when the plurality of mirrors in the reflection device 37 are tilted by a second angle, light beams reflected by the reflection device 37 cannot travel toward the optical projection system 39. The reflection device 37 can convert red, green, and blue light beams into digitized beams by controlling the turning on/off of each of the plurality of mirrors, as described above.

The first angle represents an angle formed by a normal of the plane of the reflection device 37 and a normal of the plurality of mirrors of the reflection device 37 and is set at about −12 degrees relative to the normal of the plane of the reflection device 37. The second angle is set at about +12 degrees. The first and second angles that are set at −12 and +12 degrees, respectively, are interpreted as the driving angles of one kind of currently manufactured DMD. However, these angles may have different values for different devices.

In order to reflect incident light passing through the optical illumination system 35 to enter the optical projection system 39 through the use of the plurality of mirrors in the reflection device 37, the incident angle of the light with respect to the normal of the plane of the reflection device 37 must be about 24 degrees. On the other hand, in order not to make incident light reflected by the reflection device 37 enter the optical projection system 39, the plurality of mirrors must operate, being tilted by the second angle. If so, the angle of light incident on the reflection device 37 with respect to the normal of the plane of the reflection device 37 is about 24 degrees. However, the incident light forms an angle of 36 degrees with the normal of the plurality of mirrors, and thus is reflected by an angle of 36 degrees with respect to the normal of the plurality of the mirrors 36. Accordingly, the incident light is reflected by as much as an angle of 48 degrees with respect to the normal of the plane of the reflection device 37.

Light beams reflected by the mirrors tilted by the first angle in the reflection device 37 travel toward the optical projection system 39. The light beams passing through the optical projection system 39 appear on the screen 40. Light beams reflected by the mirrors tilted by the second angle in the reflection device 37 travel in a direction opposite to the optical illumination system 35 with respect to the optical projection system 39, and thus unnecessary light beams can be prevented from entering the optical illumination system 35 and appearing on the screen 40.

If a light beam generated by the light source 31 passes through the color filter 32, the light beam is converted into a red, green, or blue beam. When the colored beam passes through the light pipe 33 and the optical illumination system 35, the optical path is gradually varied so that the colored beam can be illuminated on the reflection device 37. The beam incident on the reflection device 37 is converted into a digitized beam by separately turning on/off pixels, and thus a unit picture image can be formed. The unit picture image passes through the optical projection system 39 and is projected on the screen 40, thereby forming an entire picture image.

Above, the case in which optical modulation is performed in the reflection device 37 has been described. However, optical modulation may be performed in the light source 31. If a laser emitting diode is used as the light source 31, the reflection device 37 does not operate each individual mirror separately, but instead operates the plurality of mirrors as a whole to turn toward the same direction, thus projecting a picture image on the screen 40.

FIGS. 3 through 6 are cross-sectional views illustrating examples of the optical illumination system 35 of the projection apparatus of the present invention.

Figure 3:
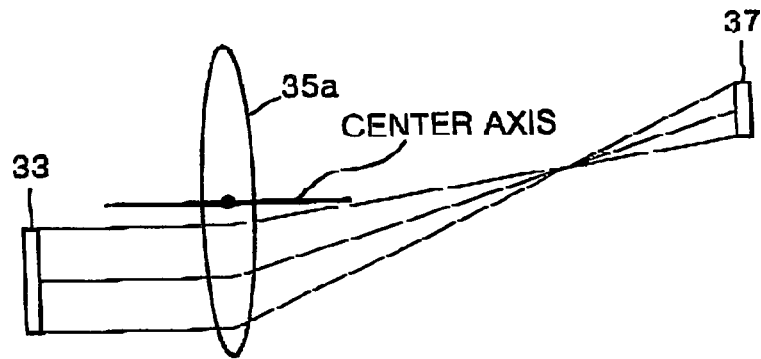
FIG. 3 is a cross-sectional view illustrating a first example of an optical illumination system of a projection apparatus according to the embodiment of FIG. 1.

Referring to FIG. 3, a first example of the optical illumination system 35 includes one lens 35*a*, which is decentered with respect to the optical axis of beams incident upon the optical illumination system 35 and thus is capable of modifying the optical path of the incident beams.

Figure 4:
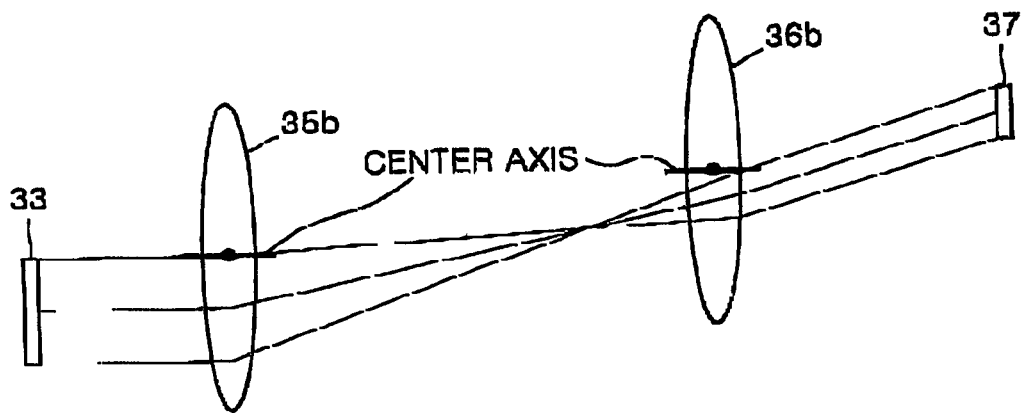
FIG. 4 is a cross-sectional view illustrating a second example of an optical illumination system of a projection apparatus according to the embodiment of FIG. 1.

Referring to FIG. 4, a second example of the optical illumination system 35 includes first and second lenses 35*b* and 36*b*, which are decentered with respect to the optical axis of beams incident upon the optical illumination system 35 and thus are capable of modifying the optical path of the incident beams. Specifically, the first lens 35*b* is decentered with respect to the optical axis of incident beams passing through the light pipe 33, and the second lens 36*b* is decentered with respect to the optical axis of incident beams passing through the first lens 35*b*.

As the number of lenses included in the optical illumination system 35 increases, the optical path of incident beams can be modified more minutely. Accordingly, the shape of beams incident upon the reflective device 37 can be maintained to be the same shape as the plane of the reflective device 37. The optical illumination system 35 can include 4–5 lenses.

Figure 5:
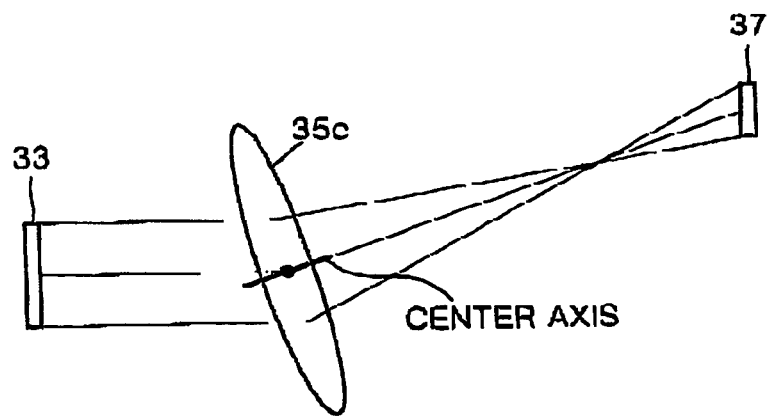
FIG. 5 is a cross-sectional view illustrating a third example of an optical illumination system of a projection apparatus according to the embodiment of FIG. 1.

Referring to FIG. 5, a third example of the optical illumination system 35 includes one lens 35*c*, which is tilted with respect to the axis of incident beams passing through the light pipe 33 and thus is capable of modifying the optical path of the incident beams passing through the light pipe 33.

Figure 6:
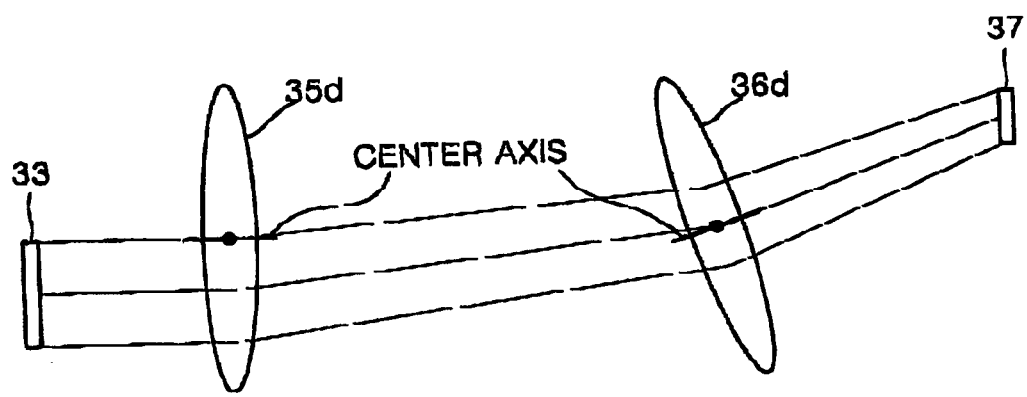
FIG. 6 is a cross-sectional view illustrating a fourth example of an optical illumination system of a projection apparatus according to the embodiment of FIG. 1.

Referring to FIG. 6, a fourth example of the optical illumination system 35 includes a first lens 35*d*, which is decentered with respect to the optical axis of incident beams passing through the light pipe 33, and a second lens 36*d*, which is tilted with respect to the optical axis of incident beams passing through the first lens 35*d*. Thus, the optical path of the incident beams passing through the light pipe 33 can be modified through the first and second lenses 35*d* and 36*d*.

In addition to the examples of the optical illumination system 35 shown in FIGS. 3 through 6, various other embodiments are possible within the scope of the present invention.

The projection apparatus according to the present invention can prevent the deterioration of contrast ratio that occurs in the prior art and thus can improve optical efficiency. In addition, in the projection apparatus according to the present invention, an optical illumination system can be simply constructed with the use of lenses. Thus, the projection apparatus can be assembled very easily and simply, and the cost of manufacturing the projection apparatus can be reduced.

As described above, since an optical illumination system can be constructed with the use of lenses, it is possible to manufacture a projection apparatus which is easy to assemble and thus reduces the cost of manufacturing the projection apparatus. In addition, the deterioration of contrast ratio can be prevented by clearly separating the optical path of the optical illumination system from the optical path of an optical projection system, and optical efficiency can be improved. Furthermore, the optical path of incident beams can be modified by appropriately arranging tilted or decentered lenses along with non-tilted and centered lenses.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:
1. A projection apparatus, comprising:
a screen;
a light source to generate light beams;
an optical projection system to project the light beams generated by the light source onto the screen;
a reflection device to reflect the light beams generated by the light source and incident thereon to travel toward the optical projection system; and
an optical illumination system, positioned in an optical path between the light source and the reflection device and tilted with respect to an optical axis of the light source to change a direction of the light beams generated by the light source to enter the reflection device at a predetermined angle, the optical axis of the light source passing through a center of a major axis of the optical illumination system.

2. The projection apparatus of claim 1, wherein the reflection device comprises a plurality of mirrors to operate at a first angle to reflect the light beams toward the optical projection system and to operate at a second angle to reflect the light beams away from the optical projection system.

3. The projection apparatus of claim 2, wherein the predetermined angle is determined with respect to a normal of a plane of the reflection device and is two times greater than the first angle with respect to the normal of the plane of the reflection device.

4. The projection apparatus of claim 2, wherein the optical illumination system comprises a first lens which is tilted with respect to the optical axis of the light source.

5. The projection apparatus of claim 1, wherein the optical illumination system comprises a first lens which is tilted with respect to the optical axis of the light source.

6. The projection apparatus of claim 1, further comprising an optical unit to shape the light beams generated by the light source into a same shape as a plane of the reflection device, wherein the optical unit is between the light source and the optical illumination system.

7. The projection apparatus of claim 6, wherein the optical unit comprises a light pipe or a fly eye lens.

8. A projection apparatus, comprising:
a screen;
a light source to generate light beams;
an optical projection system to project the light beams generated by the light source onto the screen;
a reflection device to reflect the light beams generated by the light source and incident thereon to travel toward the optical projection system; and
an optical illumination system, positioned in an optical path between the light source and the reflection device and tilted with respect to an optical axis of the light source to allow the light beams generated by the light source to enter the reflection device at a predetermined angle,
wherein the optical illumination system comprises a lens which is decentered with respect to the optical axis of the light sources,
the optical axis of the light source passing through a center of a minor axis of the optical illumination system.

9. A projection apparatus, comprising:
a screen;
a light source to generate light beams;
an optical projection system to project the light beams generated by the light source onto the screen;
a reflection device to reflect the light beams generated by the light source and incident thereon to travel toward the optical projection system; and
an optical illumination system, positioned in an optical path between the light source and the reflection device and tilted with respect to an optical axis of the light source to allow the light beams generated by the light source to enter the reflection device at a predetermined angle,
wherein the reflection device comprises a plurality of mirrors to operate at a first angle to reflect the light beams toward the optical projection system and to operate at a second angle to reflect the light beams away from the optical projection system, and the optical illumination system comprises a lens which is decentered with respect to the optical axis of the light source, the optical axis of the light source passing through a center of a major axis of the optical illumination system.

10. A projection apparatus, comprising:
a screen;
a light source to generate light beams;
an optical projection system to project the light beams generated by the light source onto the screen;
a reflection device to reflect the light beams generated by the light source and incident thereon to travel toward the optical projection system; and
an optical illumination system, positioned in an optical path between the light source and the reflection device and tilted with respect to an optical axis of the light source to allow the light beams generated by the light source to enter the reflection device at a predetermined angle,
wherein the optical illumination system comprises a plurality of lenses which are decentered with respect to the optical axis of the light source,
the optical axis of the light source passing through a center of a minor axis of the optical illumination system.

11. The projection apparatus of claim 10, wherein one of the plurality of lenses is decentered with respect to an optical axis of a previous one of the plurality of lenses.

12. A projection apparatus, comprising:
a screen;
a light source to generate light beams;
an optical projection system to project the light beams generated by the light source onto the screen;
a reflection device to reflect the light beams generated by the light source and incident thereon to travel toward the optical projection system; and
an optical illumination system, positioned in an optical path between the light source and the reflection device and tilted with respect to an optical axis of the light source to allow the light beams generated by the light source to enter the reflection device at a predetermined angle,
wherein the reflection device comprises a plurality of mirrors to operate at a first angle to reflect the light beams toward the optical projection system and to operate at a second angle to reflect the light beams away from the optical projection system, and the optical illumination system comprises a plurality of lenses which are decentered with respect to the optical axis of the light source,
the optical axis of the light source passing through a center of a major axis of the optical illumination system.

13. The projection apparatus of claim 12, wherein one of the plurality of lenses is decentered with respect to an optical axis of a previous one of the plurality of lenses.

14. A projection apparatus, comprising:
a screen;
a light source to generate light beams;
an optical projection system to project the light beams generated by the light source onto the screen;
a reflection device to reflect the light beams generated by the light source and incident thereon to travel toward the optical projection system; and an optical illumination system, positioned in an optical path between the light source and the reflection device and tilted with respect to an optical axis of the light source to allow the light beams generated by the light source to enter the reflection device at a predetermined angle, wherein the optical illumination system comprises a plurality of lenses which are tilted with respect to the optical axis of the light source, the optical axis of the light source passing through a center of a minor axis of the optical illumination system.

15. A projection apparatus, comprising:

a screen;

a light source to generate light beams;

an optical projection system to project the light beams generated by the light source onto the screen;

a reflection device to reflect the light beams generated by the light source and incident thereon to travel toward the optical projection system; and an optical illumination system, positioned in an optical path between the light source and the reflection device and tilted with respect to an optical axis of the light source to allow the light beams generated by the light source to enter the reflection device at a predetermined angle, wherein the reflection device comprises a plurality of mirrors to operate at a first angle to reflect the light beams toward the optical projection system and to operate at a second angle to reflect the light beams away from the optical projection system, and the optical illumination system comprises a plurality of lenses which are tilted with respect to the optical axis of the light source, the optical axis of the light source passing through a center of a major axis of the optical illumination system.

16. A projection apparatus, comprising:

a screen;

a light source to generate light beams;

an optical projection system to project the light beams generated by the light source onto the screen;

a reflection device to reflect the light beams generated by the light source and incident thereon to travel toward the optical projection system; and an optical illumination system, positioned in an optical path between the light source and the reflection device and tilted with respect to an optical axis of the light source to allow the light beams generated by the light source to enter the reflection device at a predetermined angle, wherein the optical illumination system comprises a plurality of lenses which are tilted with respect to the optical axis of the light source, wherein one of the plurality of lenses is tilted with respect to an optical axis of a previous one of the plurality of lenses.

17. A projection apparatus, comprising:

a screen;

a light source to generate light beams;

an optical projection system to project the light beams generated by the light source onto a reflection device to reflect the light beams generated by the light source and incident thereon to travel toward the optical projection system; and an optical illumination system, positioned in an optical path between the light source and the reflection device and tilted with respect to an optical axis of the light source to allow the light beams generated by the light source to enter the reflection device at a predetermined angle, wherein the reflection device comprises a plurality of mirrors to operate at a first angle to reflect the light beams toward the optical projection system and to operate at a second angle to reflect the light beams away from the optical projection system, and the optical illumination system comprises a plurality of lenses which are tilted with respect to the optical axis of the light source, wherein one of the plurality of lenses is tilted with respect to an optical axis of a previous one of the plurality of lenses.

18. A projection apparatus, comprising:

a screen;

a light source to generate light beams;

an optical projection system to project the light beams generated by the light source onto the screen;

a reflection device to reflect the light beams generated by the light source and incident thereon to travel toward the optical projection system; and an optical illumination system, positioned in an optical path between the light source and the reflection device and tilted or decentered with respect to an optical axis of the light source to allow the light beams generated by the light source to enter the reflection device at a predetermined angle, wherein the optical illumination system comprises a lens which is decentered with respect to the optical axis of the light source, and the optical illumination system further comprises a lens which is positioned behind the decentered lens and is tilted with respect to an optical axis of the decentered lens.

19. A projection apparatus, comprising:

a screen;

a light source to generate light beams;

an optical projection system to project the light beams generated by the light source onto the screen;

a reflection device to reflect the light beams generated by the light source and incident thereon to travel toward the optical projection system; and an optical illumination system, positioned in an optical path between the light source and the reflection device and tilted or decentered with respect to an optical axis of the light source to allow the light beams generated by the light source to enter the reflection device at a predetermined angle, and wherein the optical illumination system comprises a first lens which is tilted with respect to the optical axis of the light source, and the optical illumination system further comprises a second lens which is positioned behind the first lens and is decentered with respect to an optical axis of the first lens, the optical axis of the light source passing through a center of a minor axis of the optical illumination system.

20. A projection apparatus, comprising:

a screen;

a light source to generate light beams;

an optical projection system to project the light beams generated by the light source onto the screen;

a reflection device to reflect the light beams generated by the light source and incident thereon to travel toward the optical projection system; and an optical illumination system, positioned in an optical path between the light source and the reflection device and tilted or decentered with respect to an optical axis of the light source to allow the light beams generated by the light source to enter the reflection device at a predetermined angle, wherein the reflection device comprises a plurality of mirrors to operate at a first angle to reflect the light beams toward the optical projection system and to operate at a second angle to reflect the light beams away from the optical projection system, the optical illumination system comprises a first lens which is tilted with respect to the optical axis of the light source, and the optical illumination system further comprises a second lens which is positioned behind the first lens and is decentered with respect to an optical axis of the first lens, the optical axis of the light source passing through a center of a major axis of the optical illumination system.

21. A projection apparatus, comprising:
a screen;
a light source to generate light beams;
an optical projection system to project the light beams generated by the light source onto the screen;
a reflection device to reflect the light beams generated by the light source and incident thereon to travel toward the optical projection system;
an optical illumination system, positioned in an optical path between the light source and the reflection device and tilted with respect to an optical axis of the light source to change a direction of the light beams generated by the light source to enter the reflection device at a predetermined angle; and
a color filter to separate the light beams generated by the light source according to wavelengths, wherein the color filter is between the light source and the optical illumination system.

22. A projection apparatus, comprising:
a light source to generate light beams;
a display unit to display the light beams;
an optical illumination system, positioned in an optical path of the light beams between the light source and the display unit and tilted with respect to an optical axis of the light source to change a direction of the generated light beams; and
a reflection device to receive the light beams from the optical illumination system at a predetermined angle,
the optical axis of the light source passing through a center of a minor axis of the optical illumination system.

23. The projection apparatus of claim 22, wherein the reflection device reflects the light beams received from the optical illumination system towards the display unit.

24. The projection apparatus of claim 23, wherein the optical illumination system comprises a lens which is tilted with respect to the optical axis of the light source.

25. The projection apparatus of claim 22, wherein the reflection device comprises:
a plurality of mirrors tilted at an angle with respect to a normal of a plane of the reflection device.

26. The projection apparatus of claim 25, wherein the plurality of mirrors reflects light incident from the optical illumination system towards the display unit.

27. The projection apparatus of claim 25, wherein the plurality of mirrors reflects light incident from the optical illumination system away from the display unit.

28. The projection apparatus of claim 25, wherein the tilt angle of the mirrors is +12 degrees or −12 degrees.

29. The projection apparatus of claim 25, wherein the predetermined angle of the light received by the reflection device is 36 degrees with respect to a normal of a plane of the plurality of mirrors.

30. The projection apparatus of claim 29, wherein the light beams received by the reflection device are reflected by 48 degrees with respect to the normal of the plane of the reflection device.

31. The projection apparatus of claim 22, wherein the optical illumination system comprises a center axis which is parallel with the optical axis of the light source.

32. A projection apparatus, comprising:
a light source to generate light beams;
a display unit to display the light beams;
an optical illumination system, positioned in an optical path of the light beams between the light source and the display unit and tilted with respect to an optical axis of the light source to change a direction of the generated light beams;
a reflection device to receive the light beams from the optical illumination system at a predetermined angle,
wherein the reflection device reflects the light beams received from the optical illumination system towards the display unit;
a color filter to separate the light beams generated by the light source according to wavelengths, wherein the color filter is between the light source and the optical illumination system;
an optical unit to shape the light beams generated by the light source into a same shape as a plane of the reflection device, wherein the optical unit is between the color filter and the optical illumination system; and
an optical projection system to project the light beams generated by the light source onto the screen, wherein the optical projection system is on an optical path between the reflection device and the display unit.

33. The projection apparatus of claim 32, wherein the optical unit increases a size of the shaped light beams to a size larger than a size of the reflection device.

34. A projection apparatus, comprising:
a light source to generate light beams;
a display unit to display the light beams;
an optical illumination system, positioned in an optical path of the light beams between the light source and the display unit and tilted with respect to an optical axis of the light source; and
a reflection device to receive the light beams from the optical illumination system at a predetermined angle,
wherein the reflection device reflects the right beams received from the optical illumination system towards the display unit, and the optical illumination system comprises a first lens which is decentered with respect to the optical axis of the light sources
the optical axis of the light source passing through a center of a major axis of the optical illumination system.

35. A projection apparatus, comprising:
a light source to generate light beams;
a display unit to display the light beams;

an optical illumination system, positioned in an optical path of the light beams between the light source and the display unit and tilted or decentered with respect to an optical axis of the light source; and a reflection device to receive the light beams from the optical illumination system at a predetermined angle, wherein the reflection device reflects the light beams received from the optical illumination system towards the display unit, the optical illumination system comprises a first lens which is decentered with respect to the optical axis of the light source, and wherein the optical illumination system further comprises a second lens which is decentered with respect to an optical axis of the first lens, the optical axis of the light source passing through a center of a minor axis of the optical illumination system.

36. A projection apparatus, comprising:
a light source to generate light beams;
a display unit to display the light beams;
an optical illumination system, positioned in an optical path of the light beams between the light source and the display unit and tilted or decentered with respect to an optical axis of the light source; and
a reflection device to receive the light beams from the optical illumination system at a predetermined angle,
wherein the reflection device reflects the light beams received from the optical illumination system towards the display unit,
the optical illumination system comprises a first lens which is decentered with respect to the optical axis of the light source, and
wherein the optical illumination system further comprises a second lens which is tilted with respect to an optical axis of the first lens.

37. A projection apparatus, comprising:
a light source to generate light beams;
a display unit to display the light beams;
an optical illumination system, positioned in an optical path of the light beams between the light source and the display unit and tilted with respect to an optical axis of the light source to change a direction of the generated light beams; and
a reflection device to receive the light beams from the optical illumination system at a predetermined angle,
wherein the reflection device comprises a plurality of mirrors tilted at an angle with respect to a normal of a plane of the reflection device and
the plurality of mirrors is operated as a whole to turn toward a same direction.

38. The projection apparatus of claim 37, wherein the light source comprises a light emitting diode.

39. A projection apparatus, comprising:
a light source to generate light beams;
a display unit to display the light beams;
an optical illumination system, positioned in an optical path of the light beams between the light source and the display unit and tilted with respect to an optical axis of the light source; and
a reflection device to receive the light beams from the optical illumination system at a predetermined angle,
wherein the center axis of the optical illumination system does not coincide with the optical axis of the light source,
the optical axis of the light source passing through a center of a major axis of the optical illumination system.

40. A projection apparatus, comprising:
a light source to generate light beams;
a display unit to display the light beams;
an optical illumination system, positioned in an optical path of the light beams between the light source and the display unit and tilted or decentered with respect to an optical axis of the light source to change a direction of the generated light beams; and
a reflection device to receive the light beams from the optical illumination system at a predetermined angle,
wherein the reflection device reflects the light beams received from the optical illumination system towards the display unit,
the optical illumination system comprises a lens which is tilted with respect to the optical axis of the light source, and
a point of intersection between the optical axis of the light source and a center axis of the optical illumination system is within the lens.

41. A projection apparatus, comprising:
a light source to generate light beams;
a reflection device to reflect the light beams; and
an optical illumination system, in an optical path between the light source and the reflection device, comprising:
a first lens, having an optical axis which is decentered with respect to an optical axis of the light source, and
a second lens, tilted with respect to the first lens.

42. A projection apparatus, comprising:
a light source to generate light beams and having an optical axis;
a reflection device to reflect the light beams; and
an optical illumination system to change a direction of the generated light beams having a center axis, wherein:
a point of intersection between the optical axis and the center axis is within the optical illumination system and the optical illumination system is tilted with respect to the optical axis,
the optical axis of the light source passing through a center of a minor axis of the optical illumination system.

* * * * *

UNITED STATES PATENT AND TRADEMARK OFFICE
CERTIFICATE OF CORRECTION

PATENT NO. : 7,145,728 B2
APPLICATION NO. : 10/139247
DATED : December 5, 2006
INVENTOR(S) : Yong-dok Cha It is certified that error appears in the above-identified patent and that said Letters Patent is hereby corrected as shown below:

Column 7, Line 46, change "sources," to --source,--.

Column 9, Line 62, after "onto" insert --the screen;--.

Column 12, Line 57, change "right" to --light--.

Column 12, Line 61, change "sources" to --source,--.

Signed and Sealed this

Twentieth Day of March, 2007

JON W. DUDAS
*Director of the United States Patent and Trademark Office*